(12) United States Patent
Murakami

(10) Patent No.: US 8,145,956 B2
(45) Date of Patent: Mar. 27, 2012

(54) INFORMATION PROCESSING APPARATUS, FAILURE PROCESSING METHOD, AND RECORDING MEDIUM IN WHICH FAILURE PROCESSING PROGRAM IS RECORDED

(75) Inventor: Hiroshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 522 days.

(21) Appl. No.: 11/876,098

(22) Filed: Oct. 22, 2007

(65) Prior Publication Data

US 2010/0100776 A1    Apr. 22, 2010

(30) Foreign Application Priority Data

Dec. 27, 2006   (JP) ................................. 2006-352001

(51) Int. Cl.
*G06F 11/00*    (2006.01)
(52) U.S. Cl. .......................................... 714/57; 714/48
(58) Field of Classification Search ................... 714/48, 714/57
See application file for complete search history.

(56) References Cited

U.S. PATENT DOCUMENTS

| 6,842,870 B2 * | 1/2005 | Austen et al. ................... 714/48 |
| 6,957,364 B2 | 10/2005 | Shimooka et al. |
| 7,139,940 B2 * | 11/2006 | Arbeitman et al. ............. 714/57 |
| 7,171,590 B2 | 1/2007 | Kadoi |
| 7,409,605 B2 * | 8/2008 | Kato et al. ....................... 714/57 |
| 2002/0108074 A1 | 8/2002 | Shimooka et al. |
| 2002/0129305 A1 | 9/2002 | Ahrens et al. |
| 2004/0205413 A1 | 10/2004 | Arbeitman et al. |

FOREIGN PATENT DOCUMENTS

| JP | 2002-229806 | 8/2002 |
| JP | 2004-62535 | 2/2004 |

OTHER PUBLICATIONS

European Search Report dated Oct. 29, 2009 and issued in corresponding European Patent Application 07119624.0.

* cited by examiner

*Primary Examiner* — Charles Ehne
(74) *Attorney, Agent, or Firm* — Fujitsu Patent Center

(57) ABSTRACT

An information processing apparatus includes partitioning mode information retaining section, hardware resource management information retaining section, failure notifying section, operation mode detecting section, shared hardware resource judging section, common failure report creating section for creating, if operation in the partitioning mode is detected and a hardware resource in which the failure occurrence has been detected is judged to be a shared resource, a common failure report on the basis of the detection of failure occurrence output by the notifying sections of physical partitions that share the shared hardware resource. That can avoid excessive report of a failure occurred even at a shared hardware resource, making it possible to grasp the accurate number of failure occurrence and to manufacture in a low cost.

9 Claims, 6 Drawing Sheets

FIG. 3

| HARDWARE RESOUCE | SHARED STATE |
|---|---|
| DIMM | MONOPOLIZED |
| ICH | MONOPOLIZED |
| PCI CARD | SHARED |
| ⋮ | ⋮ |
|  |  |

INFORMATION PROCESSING APPARATUS, FAILURE PROCESSING METHOD, AND RECORDING MEDIUM IN WHICH FAILURE PROCESSING PROGRAM IS RECORDED

BACKGROUND OF THE INVENTION

1. Field of the Invention

The present invention relates to a technology to deal with a failure occurred at hardware resource divided and shared by a number of physical partitions created by means of, for example, partitioning function installed in a server system or the like.

2. Description of the Related Art

A server system for a backbone system requires high availability and flexible use of resources (hardware resources). In order to achieve these purpose, a conventional server system makes use of, for example, a physical partitioning function that divides the hardware resources into a number of physical partitions and shares the physical partitions and a partitioning function that arbitrary combine the physical partitions created by division by the physical partitioning function to thereby create a number of independent partitions. Consequently, these functions make the server system possible to use resources without being constrained by the hardware.

FIG. 6 is a diagram for explaining the physical partitioning function and the partitioning function executed in a conventional server system, and shows an example that implements and interacts functions for hardware resource allocation and for information distribution in accordance with properties of ASIC (Application Specific Integrated Circuit) and the firmware.

In the example shown in FIG. 6, server 200 includes a hardware management unit 201, and is capable to divide hardware resources, such as a memory, a PCI (Peripheral Component Interconnect) card and a chipset, into a number (m in the example shown in FIG. 6, where m is a natural number) of XPARs (Extended Partionings) 202-1, 202-2, . . . , 202-m by means of the physical partitioning function.

Each of XPARs 202-1, 202-2, . . . , 202-m is a physical partition that is formed by dividing hardware resources (modules) exemplified by SB (System Board)/IOU (Input Output Unit) and recombine the divided hardware resources into a partition configuration. Hereinafter, one particular XPAR is represented by a reference number 202-1, 202-2, . . . or 202-m as requiring discrimination of the particular XPAR from of the remaining XPARs, but an arbitrary XPAR is represented by a reference number 202.

Example shown in FIG. 6 divides the hardware resources such as ASIC 203 such that the divided hardware resources are incorporated in XPARs 202.

Further, in FIG. 6, a number of XPARs 202 are used in a number (n+1 in the example shown in FIG. 6, where n is an integer) of partition blocks P0 through Pn, and, for example, partition block P0 collectively utilizes XPARs 202-1 and 202-2; and partition block Pn utilizes XPAR 202-m with the aid of the partitioning function describe above.

Hereinafter, one particular partition block is represented by a reference number P0, P1, P2, . . . , or Pn as requiring discrimination of the particular partition block from the remaining partition blocks, but an arbitrary partition block is represented by a reference number P.

A partition block is a unit for OS (Operating System) 205 to operate, and each partition block P therefore should include at least one processor.

Hardware management unit 201 manages on/off of the power source and error information of the server 200, and includes a service processor, for example.

Also server 200 making use of the physical partitioning function and the partitioning function as shown in FIG. 6 has to accomplish accurate analysis and notification of failure information concerning a failure occurred at one of the hardware resources in the server 200 similarly to the case where server 200 inactivating the physical partitioning function.

When activating the physical partitioning function, server 200 manages and divides the hardware resources by, for example, ASIC 203, weighing reliability, mounting, a cost and congeniality with other functions, and provides firmware 204 with resource management information including such failure information. Firmware (F/W) 204, being executed for each partitioning block P, analyzes the failure information if required and manages the failure by sending the failure information to the upper layer such as OS 205, so that the hardware failure less affects on the partition block. That makes server 200 possible to flexibly extend the functions.

When the hardware resources are divided into physical partitions by use of the physical partitioning function, physical partitions created as the result of physical partitioning are classified into hardware resources independently used (hereinafter called monopolized resources) and hardware resources shared by other hardware resource (hereinafter called shared resources).

[Patent Reference 1] Japanese Patent Application Laid-Open Publication No. 2002-229806

[Patent Reference 2] Japanese Patent Application Laid-Open Publication No. 2004-62535

However, in detection of a failure on the ASCI level when activating the physical partitioning function which interconnects ASIC 30 and firmware 204, s physical partitions (XPARs 202) (where s is an integer of two or more, in the example shown in FIG. 6, s is two of XPARs 202-1, 202-2) created as the result of division of the descendant of ASIC 203 is assumed to be collectively operate as an independent partition block. If a failure occurs at a hardware resource (a shared hardware resource) shared by XPAR 202-1 and XPAR 202-2 or a failure originated in a monopolized resource or the like is propagated to XPAR 202-1 and XPAR 202-2, XPAR 202-1 and XPAR 202-2 each issue respective failure reports whereupon redundant failure reports are recorded in ASIC 203.

In other words, according to such a conventional failure processing method as activating the physical partitioning function, s redundant failure reports as many as the number of physical partitions created as a result of division are recorded in ASIC 30, and the firmware 204 analyzes the failure using the information of the recorded failure reports and excessively sends the failure to OS 205 and/or hardware management unit 201. As a consequence, that makes OS 205 and/or hardware management unit 201 impossible to manage the accurate number of failure occurrence and cannot be properly maintained. In addition, also firmware 204 problematically cannot manage accurate failure occurrences.

For example, Patent Reference 1 discloses a technique failure management occurs at hardware and software by use of a management agent and a management console that operate on OS in an open-system computer that runs two or more OSs.

The manner disclosed in Patent Reference 1 relates to a virtualization technique in which the entire functions for hardware resource allocation and information distribution are executed by software such as firmware. Namely, the reference discloses a method concerning virtual division of server hardware resource on the software level, but does not therefore apply to the physical partitioning function that physically divides a hardware resource. As yet another problem, the method of Patent Reference 1 increases load on the firmware and requires an additional guest OS to accomplish the virtualization.

In addition, since the method of Patent Reference 1 carries out management for failure occurrence by use of a management agent or a management console that operate on an OS, load on the OS increases and requirement for management console increases the manufacture cost for the server.

Still further, the server vender cannot ensure failure management because the management agent is operated on the OS by the user.

Patent Reference 2 relates to a failure processing method for a multi-processor system that uses a large-scale platform formed by an aggregation of a number of nodes. In this method, if a failure occurs at one of the nodes, the failure node notifies the service processor of failure occurrence which service processor notifies the service processor manager of the failure occurrence.

For this purpose, the patent has to provide one service processor for each node and requires a service processor manager collectively control these service processors, resulting in manufacture cost rise.

SUMMARY OF THE INVENTION

With the foregoing object in view, the present invention provides a server operable in a partitioning mode in which a hardware resource is divided into a plurality of physical partitions and at least two of the plural physical partitions operate as an independent partition block, with the objects that a failure occurred at a shared hardware resource is not excessively reported, grasping the accurate number of failure occurrence, and the server can be realized at a low manufacture cost.

To attain the above objects, as a first generic feature, there is provided an information processing apparatus operable in a partitioning mode in which a hardware resource is divided into a plurality of physical partitions and at least two of the plural physical partitions operate as an independent partition block, that apparatus comprising: a partitioning mode information retaining section retaining partitioning mode information as to whether or not that in format ion processing apparatus is operating in the partitioning mode; a hardware resource management information retaining section retaining hardware resource management information concerning a sharing state of the hardware resource while that information processing apparatus is in the partitioning mode; a failure notifying section, provided one for each of the plural physical partitions, detecting a failure occurrence in the hardware resource and outputting the detection of the failure occurrence; an operation mode detecting section detecting, on the basis of the partitioning mode information retained in that partitioning mode information retaining section, that the information processing apparatus is operating in the partitioning mode; a shared hardware resource judging section judging, on the basis of the hardware resource management information retained in that hardware resource management information retaining section, whether or not the hardware resource in which the failure occurrence has been detected by that failure notifying section is shared by each that physical partition and another one of that plural physical partitions; and a common failure report creating section creating, if that operation mode detecting section detects that the information processing apparatus is operating in the partitioning mode and the result of the judging by that shared hardware resource judging section is positive, a common failure report on the basis of the detection of failure occurrence output by that notifying section in each that physical partition and detection of the failure occurrence notified by a notifying section in the another physical partition.

As a second generic feature, there is provided a failure processing method in an information processing apparatus operable in a partitioning mode in which a hardware resource is divided into a plurality of physical partitions and at least two of the plural physical partitions operate as an independent partition block, that method comprising the steps of: (a) detecting, in each of the plural physical partitions, a failure occurrence in the hardware resource and outputting the detection of the failure occurrence; (b) detecting, on the basis of partitioning mode information as to whether or not the information processing apparatus is operating in the partitioning mode, that the information processing apparatus is operating in the partitioning mode; (c) judging, on the basis of hardware resource management information concerning a sharing state of the hardware resource while the information processing apparatus is in the partitioning mode, whether or not the hardware resource in which the failure occurrence has been output in that step (a) of detecting and outputting is shared by two or more of the plural physical partitions; and (d) creating, if that step (b) of detecting detects that the information processing apparatus is operating in the partitioning mode and the result of the judging in that step (c) of judging is positive, a common failure report on the basis of the detection of the failure occurrence output from the two or more physical partitions.

As a third generic feature, there is provided a failure processing program instructing a computer operable in a partitioning mode in which a hardware resource is divided into a plurality of physical partitions and at least two of the plural physical partitions operate as an independent partition block to execute the steps of: (a) detecting, in each of the plural physical partitions, a failure occurrence in the hardware resource and outputting the detection of the failure occurrence; (b) detecting, on the basis of partitioning mode information as to whether or not the computer is operating in the partitioning mode, that the computer is operating in the partitioning mode; (c) judging, on the basis of hardware resource management information concerning a sharing state of the hardware resource while the computer is in the partitioning mode, whether or not the hardware resource in which the failure occurrence has been output in that step (a) of detecting and outputting is shared by two or more of the plural physical partitions; and (d) creating, if that step (b) of detecting detects that the computer is operating in the partitioning mode and the result of the judging in the step (c) of judging is positive, a common failure report on the basis of the detection of the failure occurrence output from the two or more physical partitions.

As a fourth generic feature, there is provided a computer-readable recording medium in which the failure processing program that has been mentioned above is recorded.

The present invention guarantees the advantages below.

(1) If operation in the partitioning mode is detected and a hardware resource in which the failure occurrence has been output is judged to be a shared hardware resource, a single common failure report is created on the basis of the detection of the failure occurrence output from a number of physical partitions which shares the shared hardware. That can eliminate redundant failure notification and can output failure report same in number as the actual number of failures occurred in the hardware resources. The present invention can manage the accurate frequency of failure occurrence, thereby improving the reliability.

(2) The failure processing of the present invention can be accomplished without a dedicated device or parts, the information processing apparatus can be manufactured without an increase in cost and is therefore economic.

Other objects and further features of the present invention will be apparent from the following detailed description when read in conjunction with the accompanying drawings.

BRIEF DESCRIPTION OF THE DRAWINGS

FIG. 3 is a table showing an example of resource information of the server of FIG. 2;

DESCRIPTION OF THE PREFERRED EMBODIMENTS (a) First Embodiment

Hereinafter, a first embodiment of the present invention will now be described with reference to the accompanying drawings.

Figure 1:
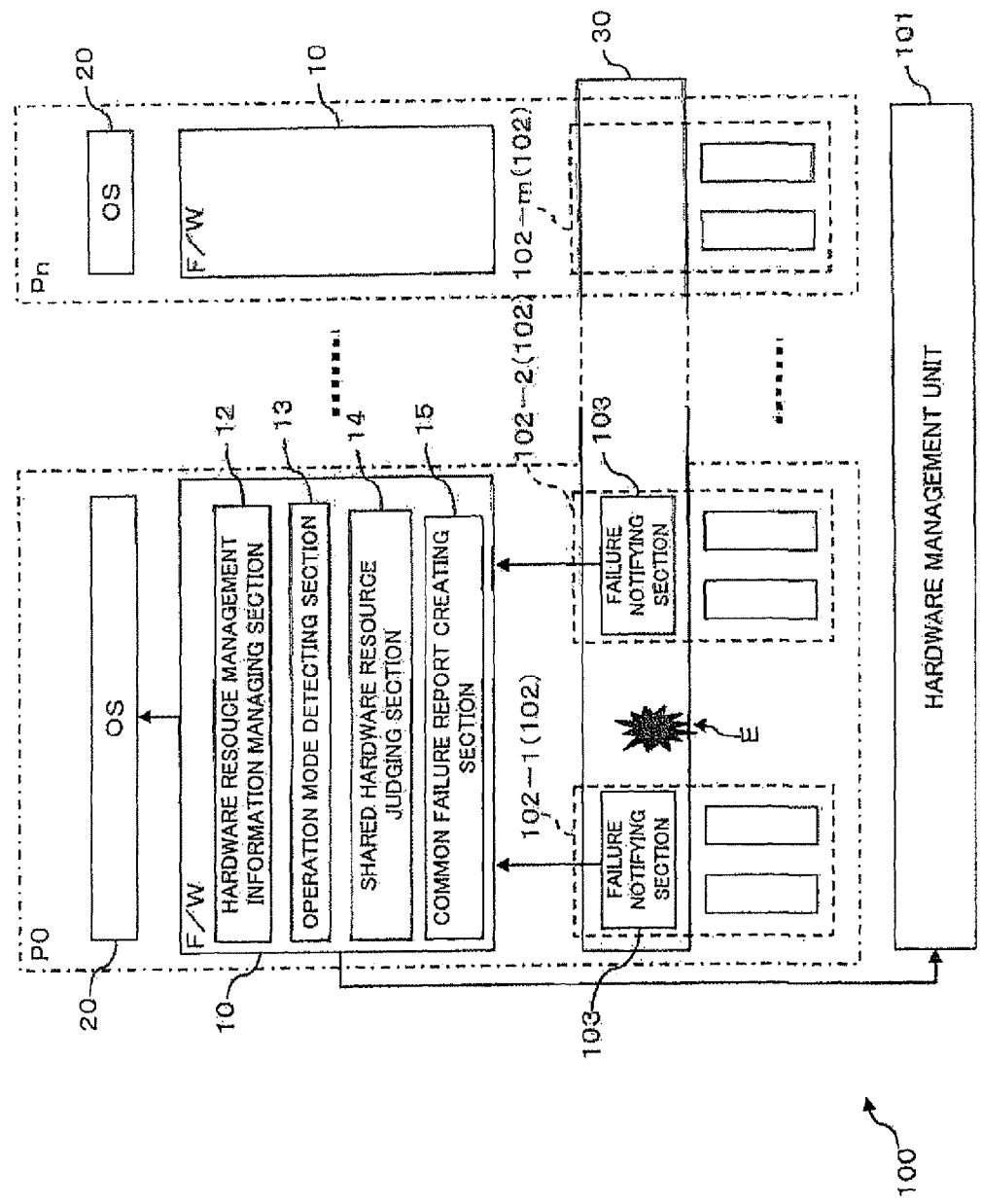
FIG. 1 is a functional block diagram schematically showing a server which executes a failure processing method according to a first embodiment of the present invention.
Figure 2:
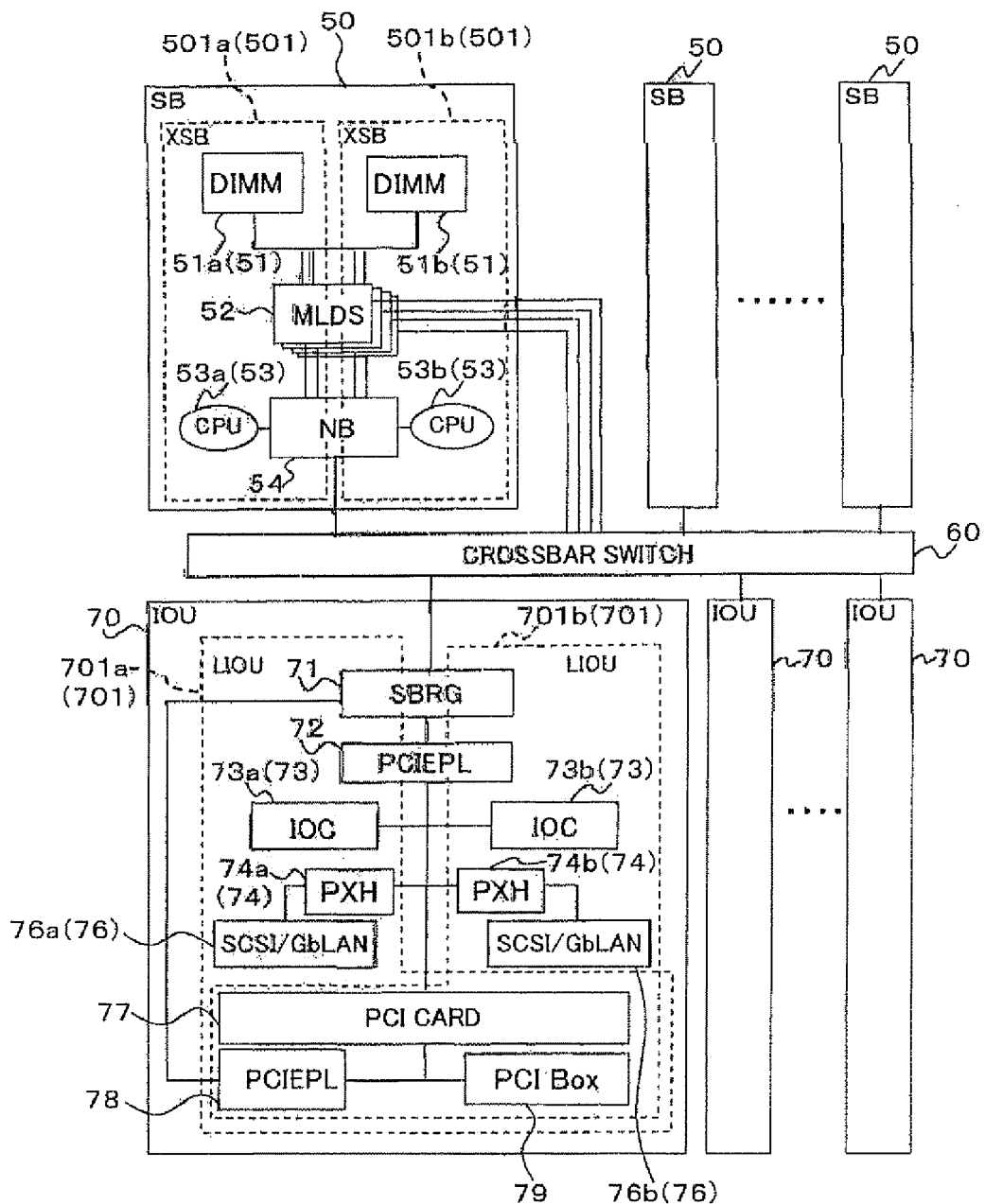
FIG. 2 is a logical block diagram schematically showing a hardware configuration of the server according to the first embodiment.

FIG. 1 is a functional block diagram schematically showing a server (information processing apparatus) which executes the failure processing method according to the first embodiment; and FIG. 2 is a logical block diagram showing a hardware configuration of the server of FIG. 1.

Server 100 is, for example, an information processing apparatus (computer) used in a backbone system, and each function of server 100 is executed by CPU 53 (see FIG. 2) or OS (Operating System) 20 executing firmware (F/W) 10 and other programs.

Server 100 has a physical partitioning function capable of dividing hardware resources, such as a memory, a PCI (Peripheral Component Interconnect) card, or a chipset, into a number (m in the example of FIG. 1, where m is a natural number) of XPARs (Extended Partitionings: physical partitions) 102-1, 102-2, . . . 102-m, and a partitioning function capable of forming a number of independent partition blocks by arbitrarily combining a number of physical partitions partitioned by means of the physical partitioning function.

XPARs 102-1, 102-2, . . . 102-m are physical partitions having a partition configuration, into which the hardware resources, such as a SB (System Board) and an IOU (Input Output Unit), incorporated in server 100 are divided. For example, XPARs 102-1, 102-2, . . . 102-m are formed by physically dividing a hardware resource such as ASIC (Application Specific Integrated Circuit) 30, as shown in FIG. 1. Hereinafter, one particular XPAR is represented by a reference number 102-1, 102-2, . . . or 102-m as requiring discrimination of the particular XPAR from of the remaining XPARs, but an arbitrary XPAR is represented by a reference number 102.

Server 100 forms a number (n+1 in the example shown in FIG. 1, where n is an integer) of partition blocks (P0 through Pn in the example of FIG. 1) by arbitrarily combining a number of XPARs 102 by use of the partitioning function above described. For example, partition block P0 collectively utilizes XPARs 102-1 and 102-2; and partition block Pn utilizes XPAR 102-m.

Server 100 can arbitrarily set activeness/inactiveness of the above partitioning function. Hereinafter, a state in which the partitioning function is active and two or more XPARs 102 (e.g., XPARs 102-1 and 102-2 in the example of FIG. 1) collectively operate as an independent partition block is sometime called operating in the partitioning mode.

Activeness/inactiveness of the partitioning function is regarded as partition mode information, which is managed by and retained in ASIC 30, as will be described below.

In server 100, the physical partitioning function and the partitioning function that are described above are realized by functions by ASIC 30 and firmware 10.

Hereinafter, one particular partition block is represented by a reference number P0, P1, P2, . . . , or Pn as requiring discrimination of the particular partition block from the remaining partition blocks, but an arbitrary partition block is represented by a reference number P.

A partition block is a unit for OS 20 to operate, and each partition block P therefore should includes at least one CPU 53.

As shown in FIG. 1, server 100 includes hardware management unit 101, which executes system management, such as power control of each hardware piece in server 100, and environment monitoring of temperature and voltages in hardware in the case, and which is equipped with a non-illustrated service processor and other devices. Further, hardware management unit 101 manages failure occurrence in server 100, and at least one of SBs (System Boards, detailed later) 50 (see FIG. 2), carries out control that server 100 is restarted using another SB 50 as a substitute the failure SB 50.

ASIC 30 is an integrated circuit to cause server 100 to realize the function for a server, and collectively represents various ASICs (Application Specific Integrated Circuits, see FIG. 2) incorporated in server 100.

As shown in FIG. 2, server 100 includes a number of SBs 50 and a number of IOUs 70, which are interconnected via crossbar switch 60.

SB 50 is a unit on which CPUs (Central Processing Units) 53a and 53b and DIMMs (Dual Inline Memory Modules) 51a and 51b are mounted, and as shown in FIG. 2, includes NB (North Bridge) 54 and MLDS (Memory and Logical Data Switch) 52 besides a number (two in the example of FIG. 2) of CPUs 53a and 53b and a number (two in the example of FIG. 2) of DIMMs 51a and 51b.

FIG. 2 illustrates a detailed hardware configuration of one of a number of SBs 50 and that of one of a number of IOUs 70 for convenience and omits those of the remaining SBs 50 and the remaining IOUs 70.

Each of CPU 53a and 53b realizes the function of server 100 by executing and arithmetic-operating programs, and DIMMs 51a and 51b are memories in which various programs (commands) and data are temporarily stored and expanded for execution of programs by CPUs 53a and 53b.

Hereinafter, one particular CPU is represented by a reference number 53a or 53b as requiring discrimination of the particular CPU from the remaining CPUs, but an arbitrary CPU is represented by a reference number 53.

Hereinafter, one particular DIMM is represented by a reference number 51a or 51b as requiring discrimination of the particular DIMM from of the remaining DIMMs, but an arbitrary DIMM is represented by a reference number 51.

NB 54 and MLDS 52 are chipsets which interconnects CPU 53a and 53b, DIMMs 51a and 51b and an IO controller to realize the control by server 100. NB 54 is an ASIC to control CPUs 53a and 53b, functions as a North Bridge and is connected to each of CPUs 53a and 53b via FSB (Front Side Bus) 55 serving as an interface.

MLDS 52 is an ASIC to control DIMM 51a and 51b. The example shown in FIG. 2 includes four MLDSs 52 which carry out data exchange among DIMMs 51a and 51b, NB 54 and crossbar switch 60.

IOU 70 is a unit to connect peripheral device (not shown) such as a LAN or a harddisk drive, to the server 100 and as shown in FIG. 2, includes SBRG (South Bridge) 71, PCIEPLs (PCI Express Physical Layers) 72 and 78, IOC (Input Output Controller) 73a and 73b, PHXs 74a and 74b, SCSI/GbLANs 76a and 76b, PCI card 77 and PCI Box 79.

Each of SBRG 71, and PCIEPLs 72 and 78 is an ASIC to control high-speed IO (Input Output) control interface (PCI-Express). SBRG 71 functions as a south bridge and controls access from CPUs 53a and 53b to a peripheral device and data transfer (DMA: Direct Memory Access) from a peripheral device to CPUs 53a and 53b. PCIEPLs 72 and 78 function as PCL-E physical layers.

Each of IOCs 73a and 73b is an IO control chip and serves functions as a management LAN, a timer and others. PXHs 74a and 74b convert PCI-Express to PCI bus bridge and function as PCI Express HUB.

SCSI/GbLANs 76a and 76b are IO interfaces in the form of, for example, SCSI (Small Computer System Interface) cards or LAN (gigabit LAN) cards, and are connected to a device, e.g., a harddisk drive, confirming to SCSI standards, to a LAN cable or to others. The example of FIG. 2 illustrates the SCSI interface and the LAN interface by the same IO interface unit, for convenience. But, these interfaces should by no means be limited to take a single interface unit and various modifications can be suggested. Alternatively, the SCSI interface and the LAN interface may be separately installed in each IOU.

PCI card 77 is an IO interface based on PCI standard and is connected to various devices confirming to PCI standard. PCI Box 79 is an expansion box to increase the number of PCI devices connectable to the IOU.

Crossbar switch 60 interconnects SB 50 and IOU 70, and includes an address crossbar and a data crossbar (both not shown).

In the example shown in FIG. 2, SB 50 is divided (physically divided) into XSB 501a and XSB 501b by means of the physical partitioning function described above so that DIMM 51a and CPU 53a are included in XSB 501a and DIMM 51b and CPU 53b are included in XSB 501b. However, MLDS 52 and NB 54 are shared by XSB 501a and XSB 501b.

In other words, in SB 50, DIMM 51a and CPU 53a are monopolized resources (monopolized hardware resource) monopolized by XSB 501a; and DIMM 51b and CPU 53b are monopolized resources monopolized by XSB 501b. MLDS 52 and NB 54 are shared resources (shared hardware resources) shared by XSB 501a and XSB 501b.

XSB is a designation of a LSB, one of two LSBs which are created by XPAR (extended-partitioning) an SB. Hereinafter, one particular XSB is represented by a reference number 501a or 501b as requiring discrimination of the particular XSB from the remaining XSBs, but an arbitrary XSB is represented by a reference number 501.

Meanwhile, IOU 70 is divided into LIOU 701a and LIOU 701b by means of the above-described physical partitioning function. Physical partitioning is performed on IOU 70 such that IOC 73a, PHX 74a, and SCSI/GbLAN 76a are included in LIOU 701a while IOC 73b, PHX 74b, and SCSI/GbLAN 76b are included in LIOU 701b. Besides, SBRG 71, PCIEPLs 72 and 78, PCI card 77 and PCI Box 79 are shared between LIOU 701a and LIOU 701b.

In brief, in IOU 70, IOC 73a, PHX 74a and SCSI/GbLAN 76a are monopolized resources monopolized by LIOU 701a; and similarly IOC 73b, PHX 74b and SCSI/GbLAN 76b are monopolized resources monopolized by LIOU 701b.

An LIOU represents a partition particle size of an IOU. Hereinafter, one particular LIOU is represented by a reference number 701a or 701b as requiring discrimination of the particular LIOU from of the remaining LIOUs, but an arbitrary LIOU is represented by a reference number 701.

In the present embodiment, an IOU which is not partitioned is conveniently denoted as an IOU with the intention that an IOU is discriminated from LIOU created by dividing an IOU.

For example, MLDSs 52, NB 54, SBRG 71 and PCIEPL 72 in FIG. 2 are called ASIC 30 of FIG. 1 in a lump.

ASIC 30 has a function of failure notification which function detects failure occurrence (at point E in FIG. 1) in the hardware resource and outputs the detection of the failure occurrence. If a failure occurs in a hardware resource descendent of ASIC 30, ASIC 30 records failure information (e.g., the point of failure occurrence and details (error code) or the like) therein and inputs a trap into CPU 53 incorporated in a partition block P to which the XSB or LIOU in question belongs as a notification of failure occurrence.

Further, ASIC 30 stores an error intensity and failure point data in a register (not shown) of NB 54 of a Home LSB, and inputs an interruption to firmware 10.

A Home LSB is an LSB to which a starting address of a partition block is allocated, and is an LSB ascendant of a hardware resource at which the failure occurs.

An LSB represents a partition particle size of SB 50. An LSB equals to an XSB (LSB=XSB) during XPAR partitioning mode (during operation activating physical partitioning function); and an LSB equals to a PSB (LSB=PSB) during non-partitioning mode (during operation inactivating the physical partitioning function). A PSB is a designation of an SB 50 being used as a single LSB without being XPAR-divided.

ASIC 30 outputs a failure occurrence notification for each XPAR 102 and therefore functions as failure notifying sections 103, provided one for each XPAR 102, for detecting failure occurrence in a hardware resource and outputs the detection of the failure occurrence.

A failure in a hardware resource which failure is detected by ASIC 30 may be a failure occurred (originated) in the hardware resources in question and may be a failure which is originated in another hardware resource and which is propagated to the hardware resource in question. ASIC 30 detects either failure and notifies firmware 10 of the detection of the failure occurrence.

Firmware 10 is a program to realize various functions (of server 100), and is stored in a ROM (Read Only Memory) chip or the like mounted on SB 50 and executed by CPU 53 installed in each XSB 501.

Specifically, besides being a program realizing the physical partitioning function and the partitioning function detailed above, firmware 10 is a program to cause server 100 to function as hardware resource management information managing section 12, operation mode detecting section 13, shared hardware resource judging section 14, and common failure report creating section 15 that are to be detailed below. Each CPU 53 in server 100 executes firmware 10, and thereby functions as hardware resource management information managing section 12, operation mode detecting section 13, shared hardware resource judging section 14, and common failure report creating section 15, as shown in FIG. 1.

In FIG. 1, functions of hardware resource management information managing section 12, operation mode detecting section 13, shared hardware resource judging section 14, and common failure report creating section 15 in partition block Pn and a function for failure notifying section 103 in XPAR 102 are omitted for convenience.

Firmware 10 may be provided in the form of being stored in a ROM chip mounted on ASIC 30 as described above, and alternatively in the form of being recorded in a computer-readable recording medium, such as a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk, or a magneto-optical disk. Further, server 100 may read firmware 10 from the recording medium and sends the read firmware 10 to an internal or external memory to store for use. Further alternatively, firmware 10 may be recorded in a memory device (a recording medium), such as a magnetic disk, an optical disk or a magneto-optical disk, and is provided to server 100 from the memory device through a communication path.

In order to realize the functions as hardware resource management information managing section 12, operation mode detecting section 13, shared hardware resource judging section 14, and common failure report creating section 15, a microprocessor (in the illustrated example, CPU 53) in server 100 executes firmware 10 stored in an internal memory (in the illustrated example, a ROM chip). At that time, the execution may be carried out by server 100 reading firmware 10 stored in a recording medium.

Here, a computer (server 100) is a concept of a combination of hardware and an OS and means hardware which operates under control of the OS. Otherwise, if an application program operates hardware independently of an OS, the hardware corresponds to the computer. Hardware includes at least a microprocessor such as a CPU and means to read a computer program recorded in a recording medium. In the first embodiment, server 100 serves to function as a computer.

The recording medium used in the first embodiment may be various computer-readable recording media such as an IC card, a ROM cartridge, a magnetic tape, a punch card, an internal storage unit (RAM or ROM) for a computer, an external storage unit, or a printing matter on which codes, such as bar codes, are printed, in addition to a flexible disk, a CD (e.g., CD-ROM, CD-R, CD-RW), a DVD (e.g., DVD-ROM, DVD-RAM, DVD-R, DVD+R, DVD-RW, DVD+RW), a magnetic disk, an optical disk and a magnet-optical disk above listed.

Operation mode detecting section 13 detects, on the basis of partitioning mode information retained in a register (partitioning mode information retaining section) or the like of ASIC 30, that server 100 is operating in the partitioning mode. Upon notification (outputting) of failure occurrence from XPAR 102, operation mode detecting section 13 confirms partitioning mode information retained in ASIC 30 to detect whether or not server 100 is operating in the partitioning mode.

Here, the partitioning mode information indicates whether or not server 100 is operating in the partitioning mode and is managed and set by ASIC (partitioning mode information management section) 30. For example, bit "1" and bit "0" are set and stored in a predetermined memory region (partitioning mode information retaining section) such as a register or the like in the ASIC 30 when server 100 is operating in the partitioning mode and when server 100 is not operating in the partitioning mode, respectively. The partitioning mode information is set for each hardware resource, for example.

Operation mode detecting section 13 obtains the partitioning mode information by confirming the bit set in the ASIC 30, and thereby confirms whether or not server 100 is in the partitioning mode. The partitioning mode information may include attribute data indicating which partition block the relevant hardware resource belongs to.

The hardware resource management information managing section 12 manages resource information (hardware resource management information) concerning a sharing state of hardware resources while server 100 is in the partitioning mode, and for example, stores the resource information in a memory region (hardware resource management information retaining section), such as DIMM 51, determined beforehand for management.

FIG. 3 shows an example of resource information of server 100 according to the first embodiment. As shown in FIG. 3, the resource information indicates whether each hardware resource is a shared resource (shared) or a monopolized resource (monopolized). For example, setting bit "0" for a monopolized resource and bit "1" for a shared resource allows shared hardware resource judging section 14 to confirm whether a hardware resource is a shared resource or a monopolize resource by confirming the bit value.

The resource information is created and set on the basis of information of the settings of the physical partitioning function and/or the partitioning function when, for example, the firmware 10 and ASIC 30 are to realize these functions.

In server 100, a predetermined memory region, such as DIMM 51, managed and utilized by firmware functions as a hardware resource management information retaining section for retaining resource information (hardware resource management information). Hereinafter, retaining information in a predetermined memory region, such as DIMM 51, managed and utilized by firmware 10 is described simply by "firmware 10 retains the information".

Shared hardware resource judging section 14 judges whether or not a hardware resource in which the failure occurrence has been detected by ASIC 30 is a shared resource on the basis of resource information. Specifically, shared hardware resource judging section 14 retrieves resource information with reference to failure information (e.g., point of occurrence) about the occurred failure and judges whether or not the hardware resource related to the failure occurrence is a shared resource.

Failure information is stored in, for example, a memory region of ASIC 30 or firmware 10.

Common failure report creating section 15 creates, if operation mode detecting section 13 detects server 100 is in the partitioning mode and shared hardware resource judging section 14 judges that a hardware resource (failure source) the failure occurrence of which is detected by ASIC 30 is a shared resource, a single common failure report using failure detection notifications output from two or more XPARs 102 sharing the hardware resource of the failure source.

Common failure report creating section 15 merges failure information of shared resources obtained from ASIC 30 in a unit of management by ASIC 30.

In the event of failure occurrence in a hardware resource, a bit (a failure notification bit) is set at a register (at a predetermined physical position) of ASIC 30 associated with the failure hardware resource, and firmware 10 obtains failure information with reference to the bit.

If the failure hardware resource is a shared resource created as the result of physical partitioning, a bit (a failure notification bit) is set at a predetermined position in a register of each ASIC 30 corresponding to the shared resource. Common failure report creating section 15 reads all the failure notification bits set at different physical positions, and concurrently merges all the failure notification bits into one information piece by calculating the logical sum of all the failure notification bits.

In other words, common failure report creating section 15 creates failure report on the basis of information piece obtained by merging all the failure notification bits when acquisition, and as a consequence, creates a common failure report.

After firmware 10 reads the failure notification bits set in the registers of ASIC 30, the failure notification bit is cleared, and at that time, the clear of all the failure notification bits is carried out with reference to information as merging two or more failure notification bits into an information piece.

If server 100 is not in the partitioning mode, common failure report creating section 15 does not merge failure information.

On the basis of a failure occurrence notification from XPAR 102, firmware 10 judges whether the failure is originated in the hardware resource failure occurrence of which has been output or is propagated to the same hardware resource, and if the failure is judged to be propagated to the hardware resource, firmware 10 judges that no failure occurs and does not deal with the failure occurrence any longer. Namely, firmware 10 deals with a failure originated in a hardware resource failure occurrence of which has been output.

Judgment as to whether a failure is originated in or propagated to a hardware resource by firmware (failure judgment section) 10 is carried out by performing a masking process using an error bit retained in ASIC 30. If firmware 10 cannot judge whether the failure is originated in or propagated to the hardware resource failure occurrence of which has been output only by such a masking process, firmware 10 further analyzes additional information if required.

If a failure notification is output from XPAR 102 and the failure notified by the failure notification is originated in the same XPAR 102, firmware 10 creates a common failure report and sends the created common failure report to OS 20 and/or hardware management unit 101.

Upon receipt of a common failure report, OS 20 and/or hardware management unit 101 carry out predetermined process using the receipt report.

In the event that a failure in an SB 50 is detected, hardware management unit 101 carries out control exemplified by restarting server 100 using another SB 50 as a substitute for the failure SB 50. Also OS 20 issues an error notification to users, restarting the own partitioning block, and carries out other operations when a failure is detected. Use of special management software makes OS 20 possible to receive information sent from firmware 10.

Figure 4:
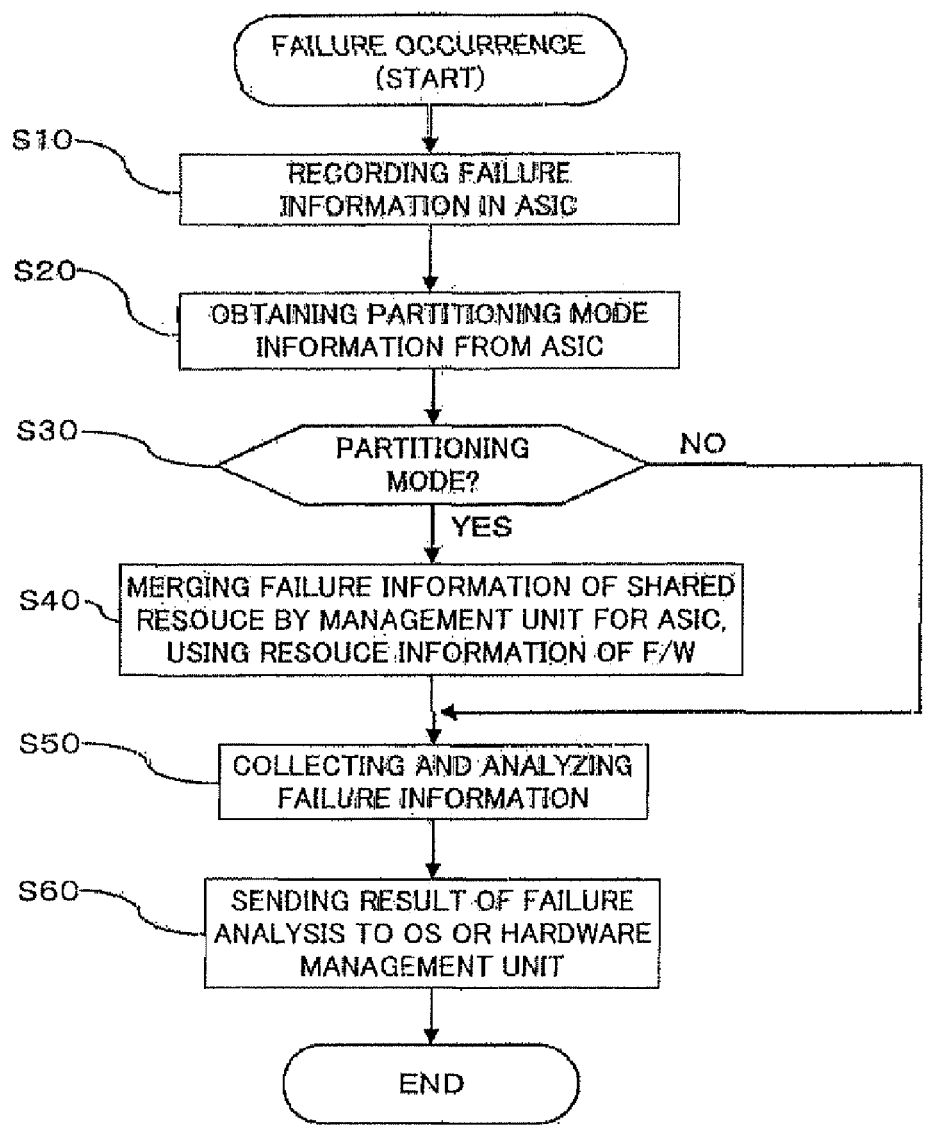
FIG. 4 is a flow diagram showing a succession of procedural steps carried out in the event of failure occurrence.

A succession of procedural steps performed when failure occurrence in server 100 according to the first embodiment will now be described with reference to flow diagram FIG. 4 (steps S10-S60).

When a failure occurs in a hardware resource of server 100, a trap is input into CPU 53 corresponding to XSB 501 or LIOU 701 that is the origin of the failure. Failure information including an error intensity and position information is recorded in the register of NB 54 for Home LSB (step S10), and firmware 10 receives an interruption.

Operation mode detecting section 13 in firmware 10 obtains partitioning mode information retained in ASIC 30 (step S20) and confirms whether or not server 100 is operating in the partitioning mode with reference to the obtained partitioning mode information (step S30).

If server 100 is in the partitioning mode (YES route in step S30), shared hardware resource judging section 14 judges whether or not a hardware resource in which the failure occurrence has been detected by ASIC 30 is a shared resource with reference to resource information, and merges failure information concerning a shared resource by a unit for management by ASIC 30 in order to crate a single error information piece (a common failure report) (step S40).

For example, since FSB 55 and DIMM 51 are obviously monopolized resources, failure information except that concerning FSB 55 and DIMM 51 can be regarded as failure information concerning shared resources and can be merged.

In succession, firmware 10 analyzes error information created as a result of the merging, and additionally collects and analyzes information about MLDS 52, SBRG 71, PCIEPL 72 and PIX 74 if required (step S50). On the contrary, if server 100 is not in the partitioning mode (NO route in step S30), the procedure jumps to step S50.

Firmware 10 sends the result of the analysis (the failure analysis result) to OS 20 and/or hardware management unit 101 (step S60) to complete the procedure.

Figure 5:
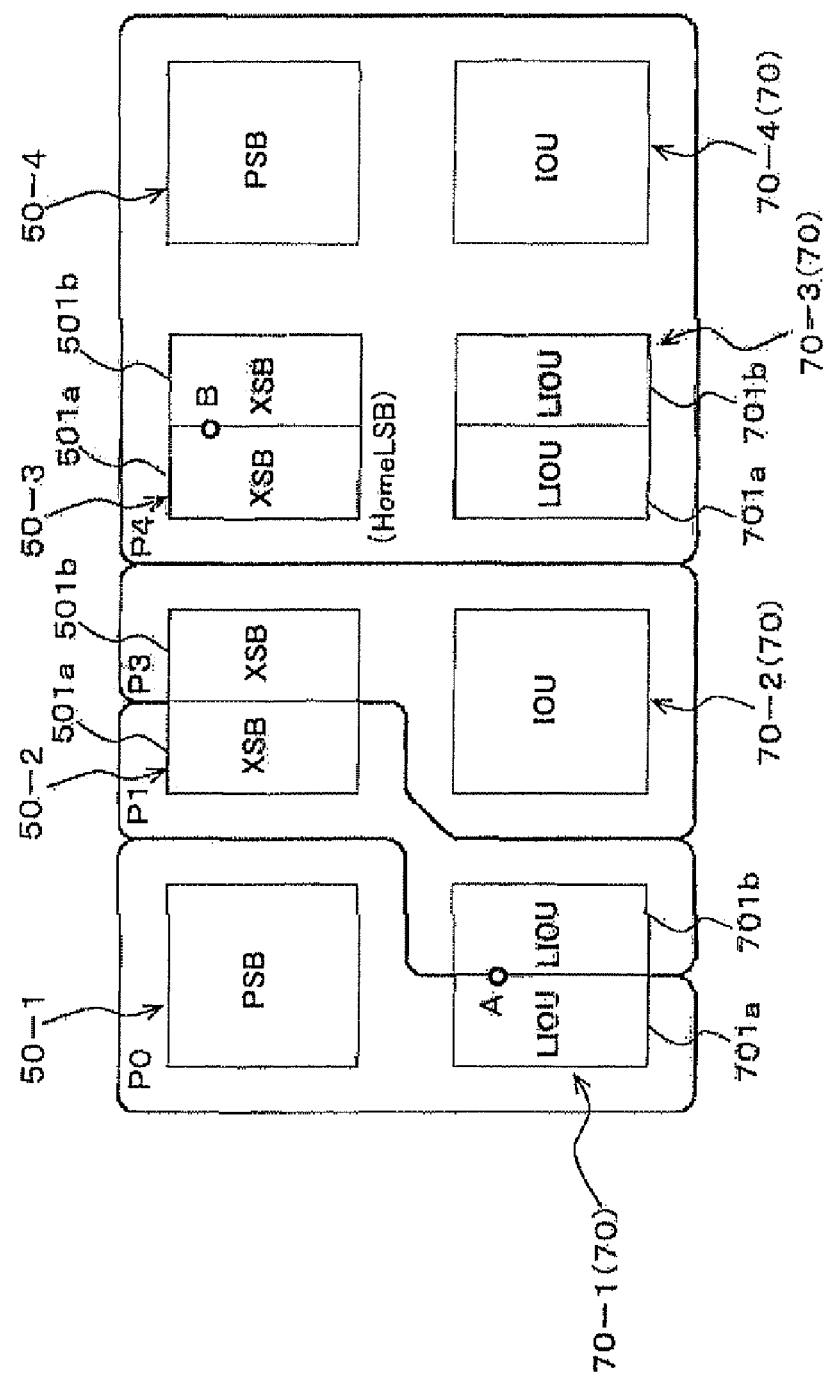
FIG. 5 is a diagram schematically illustrating an example of a configuration of partition blocks of a server according to the first embodiment.
Figure 6:
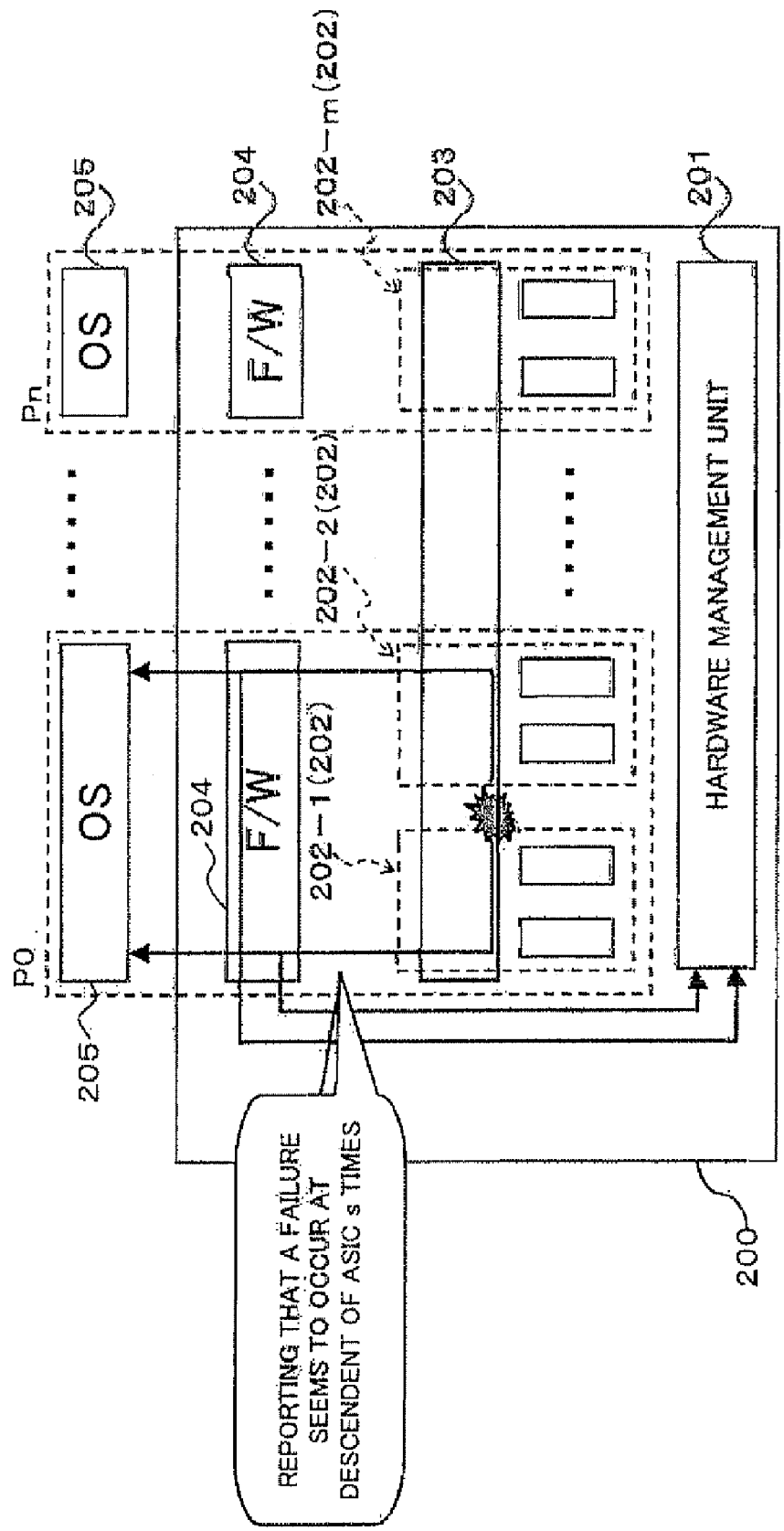
FIG. 6 is a diagram showing conventional physical partitioning function and conventional partitioning functioning for a server system.

FIG. 5 shows an example of the configuration of partition blocks P in server 100 according to the first embodiment, and specifically illustrates four partition blocks P0-P3 formed by utilizing the physical partitioning function and the partitioning function.

The example shown in FIG. 5 includes four SBs (50-1, 50-2, 50-3, 50-4); each of SBs 50-2 and 50-3 is partitioned into XSB 501a and XSB 501b by the physical partitioning function, and SBs 50-1 and 50-4 are not partitioned (i.e., SB=LSB). FIG. 5 omits illustration of crossbar switch 60, for convenience.

Further, the example shown in FIG. 5 includes four IOUs 70 (70-1, 70-2, 70-3, 70-4); each of IOUs 70-1 and 70-3 is partitioned into LIOU 701a and LIOU 701b by the physical partitioning function, and IOUs 70-2 and 70-4 are not partitioned.

By means of the partitioning function, partition block P0 includes PSB 50-1 and LIOU 701a, which is a partition of IOU 70-1; partition block P1 includes XSB 501a, which is a partition of SB 50-2, and LIOU 701b, which is the other partition of IOU 70-1; partition block P2 includes XSB 501b, which is the other partition of SB 50-2, and IOU 70-2; and partition block P3 includes XSB 501a and XSB 501b that are the partitions of SB 50-3, LIOU 701a and LIOU 701b that are the partitions of IOU 70-3, PSB 50-4 and IOU 70-4.

Concerning LIOU 701a and LIOU 701b created by physically partitioning IOU 50-1, LIOU 701a and LIOU 701b are used in partition block P0 and partition block P1, respectively. In other words, LIOU 701a and LIOU 701b formed by physically partitioning IOU 50-1 are used in respective different partition blocks, i.e., in partition block P0 and partition block P1, respectively. In the same manner, XSB 501a and XSB 501b, into which SB 50-2 is physically partitioned, are used in respective different partition blocks, i.e., in partition block P1 and partition block P2, respectively.

In server 100 in which a number of partitions P0-P3 are created as shown in FIG. 5, if a failure occurs at modules (hardware resources) (see point A in FIG. 5), exemplified by XSB 501a and LIOU 701b for partition block P1, which is physically partitioned and is used in different partition blocks, a procedure to deal with the failure is performed on both partition blocks P0 and P1, and a common failure report is sent to OS 20 and/or hardware management unit 101.

When a failure occurs in a module (a shared resource) (see point B in FIG. 5), exemplified by SB 50-3, in which XSB 501a and XSB 501b physically partitioned are used in the same partition block, an error for each of XSB 501a and XSB 501b is reported on the ASIC level but common failure report creating section 15 in firmware 10 creates one common failure report and thereby prohibits redundant error report output. As a result, even a failure occurred at a shared resource is regarded and dealt as one failure, and a single failure report is sent to OS 20 and/or hardware management unit 101.

In partition block P3, failure information concerning each of SB 50-3, SB 50-4, IOU 70-3 and IOU 70-4 is independent for each other. When a failure occurs at any of SB 50-3, SB 50-4, IOU 70-3 and IOU 70-4, the failure affects on (propagated to) inside SB 50-3, SB 50-4, IOU 70-3 and IOU 70-4, respectively. If a failure occurs at one of SB 50-3, SB 50-4, IOU 70-3 and IOU 70-4, each of SB 50-3, SB 50-4, IOU 70-3 and IOU 70-4 sends a failure report to XSB 501a serving as the Home LSB.

After that, firmware 10 receives an interruption from CPU 53 via NB 54 of XSB 501a serving as the Home LSB and starts collection and analysis of information.

On the contrary, when a failure occurs at a monopolized resource, notification of the failure occurrence is sent only to one of PSB 50-1, PSB 50-4, XSB 501a, XSB 501b, IOU 701-2, IOU 70-4, LIOU 701a and LIOU 701b, which one corresponds to the monopolized resource, and consequently the correct number of failure occurrences is grasped.

As described above, in server 100 of the present invention, when a failure is detected at a shared hardware resource during operation in the partitioning mode, firmware 10 merges failure notification bits (failure notifications) and creates a single common failure report on the basis of a single information piece obtained as a result of the merging It is possible to prevent redundancy failure notification from being sent to OS 20 and/or hardware management unit 101, and consequently failures same in number as the number of actual failure occurrence at hardware resources are output. Advantageously, that makes it possible to manage the accurate frequency of failure occurrence, thereby improving the reliability of server 100.

Further advantageously, firmware 10 deals with failures, requiring no dedicated device or part, and server 100 can be fabricated in low costs and is therefore economic. In addition, since the failure processing of the present invention is not software which operates on OS 20, the failure processing can be carried out without being noticed by users of server 100. For a vender that provides the function of the present invention, the information processing apparatus and a method and a program for processing failures of the present invention can be realized and managed with ease.

The physical partitioning function includes the partitioning function, so that the functions of server 100 can be flexibly expanded.

Further, the present invention should by no means be limited to the foregoing embodiment, and various changes or modifications may be suggested without departing from the gist of the invention.

For example, the hardware configuration of the present sever 100 should by no means be limited to that illustrated in FIG. 2, and alternatively can be variously modified without departing from the concept of the present invention.

What is claimed is:

1. An information processing apparatus operable in a partitioned mode in which hardware resources are exclusively-used or shared by a plurality of physical partitions and at least two of the plural physical partitions operate as independent partitions, said apparatus comprising:

a partitioned mode information storage section that stores partitioned mode information indicating whether or not said information processing apparatus is operating in the partitioned mode;

a hardware resource management information storage section that stores hardware resource management information indicating whether the respective hardware resources are exclusively-used or shared in the partitioned mode of said information processing apparatus;

a plurality of failure notifying sections, provided for each of the plural physical partitions, each of the failure notifying sections detecting a failure occurrence in a hardware resource belonging to the physical partition corresponding to the failure notifying section and outputs the detection of the failure occurrence;

an operation mode detecting section that detects, on the basis of the partitioned mode information stored in said partitioned mode information storage section, that said information processing apparatus is operating in the partitioned mode;

a shared hardware resource determining section that determines, on the basis of the hardware resource management information stored in said hardware resource management information storage section, whether or not the failed hardware resource is shared by two or more of said plural physical partitions; and a common failure report generating section that generates, if said operation mode detecting section detects that said information processing apparatus is operating in the partitioned mode and said shared hardware resource determining section determines that the failed hardware resource is shared by two ore more of said physical partitions, a single common failure report on the basis of the detection of failure occurrence output by said notifying section in each said physical partition, wherein, if two or more of the failure notifying sections output detections of failure occurrences, the common failure report generating section determines whether the detections of failure occurrences are originated from a same failure, on the basis of information from the shared hardware resource determining section, and generates the single common failure report by merging failure occurrences output by each physical partition sharing the failed hardware resource by logical ORing the failure occurrences output by each physical partition sharing the failed hardware resource, if it is determined that the detections of failure occurrences are originated from a same failure.

2. The information processing apparatus according to claim 1, wherein the common failure report creating section merges the detections into one information piece.

3. The information processing apparatus according to claim 2, wherein the common failure report creating section creates the common failure report based on the one information piece.

4. A failure processing method in an information processing apparatus operable in a partitioned mode in which hardware resources are exclusively-used or shared by a plurality of physical partitions and at least two of the plural physical partitions operate as independent partitions, said method comprising:

detecting, in each of the plural physical partitions, a failure occurrence in a hardware resource belonging to the physical partition corresponding to the failure notifying section and outputting the detection of the failure occurrence;

detecting, on the basis of partitioned mode information indicating whether or not the information processing apparatus is operating in the partitioned mode, that the information processing apparatus is operating in the partitioned mode;

determining, on the basis of hardware resource management information indicating whether the respective hardware resources are exclusively-used or shared in the partitioned mode of said information processing apparatus, whether or not the failed hardware resource is shared by two or more physical partitions;

generating, if it is detected that the information processing apparatus is operating in the partitioned mode in the detecting and it is determined that the failed hardware resource is shared by two or more of the plural physical partitions in the determining, a single common failure report on the basis of the detections of the failure occurrences output from the two or more physical partitions; and if two or more detections of failure occurrences are output, determining whether the detections of failure occurrences are originated from a same failure, on the basis of information from the determining, and generating the single common failure report by merging failure occurrences output by each physical partition sharing the failed hardware resource by logical ORing the failure occurrences output by each physical partition sharing the failed hardware resource, if it is determined that the detections of failure occurrences are originated from a same failure.

5. The failure processing method according to claim 4, further comprising merging the detections into one information piece.

6. The failure processing method according to claim 5, wherein the creating creates the common failure report based on the one information piece.

7. A computer-readable recoding medium in which a failure processing program is stored, said program instructing a computer operable in a partitioned mode in which hardware resources are exclusively-used or shared by a plurality of physical partitions and at least two of the plural physical partitions operate as independent partitions, to execute:

detecting, in each of the plural physical partitions, a failure occurrence in a hardware resource belonging to the physical partition corresponding to the failure notifying section and outputting the detection of the failure occurrence;

detecting, on the basis of partitioned mode information indicating whether or not the information processing apparatus is operating in the partitioned mode, that the information processing apparatus is operating in the partitioned mode;

determining, on the basis of hardware resource management information indicating whether the respective hardware resources are exclusively-used or shared in the partitioned mode of said information processing apparatus, whether or not the failed hardware resource is shared by two or more physical partitions;

generating, if it is detected that the information processing apparatus is operating in the partitioned mode in the detecting and it is determined that the failed hardware resource is shared by two or more of the plural physical partitions in the determining, a single common failure report on the basis of the detections of the failure occurrences output from the two or more physical partitions; and if two or more detections of failure occurrences are output, determining whether the detections of failure occurrences are originated from a same failure, on the basis of information from the determining, and generating the single common failure report by merging failure occurrences output by each physical partition sharing the failed hardware resource by logical ORing the failure occurrences output by each physical partition sharing the failed hardware resource, if it is determined that the detections of failure occurrences are originated from a same failure.

8. The computer-readable recording medium according to claim 7, further comprising merging the detections into one information piece.

9. The computer-readable recording medium according to claim 8, wherein the creating creates the common failure report based on the one information piece.

* * * * *